Nov. 12, 1935.  R. M. ZIMBER  2,020,983
AUTOMATIC SEALING DEVICE FOR EXHAUST MACHINES
Filed Nov. 19, 1929  4 Sheets-Sheet 1

INVENTOR
RAYMOND M. ZIMBER
BY
Darby & Darby
ATTORNEY

Nov. 12, 1935.  R. M. ZIMBER  2,020,983

AUTOMATIC SEALING DEVICE FOR EXHAUST MACHINES

Filed Nov. 19, 1929    4 Sheets-Sheet 4

INVENTOR
RAYMOND M. ZIMBER
BY
Darby & Darby
ATTORNEY

Patented Nov. 12, 1935

2,020,983

UNITED STATES PATENT OFFICE 2,020,983

AUTOMATIC SEALING DEVICE FOR EXHAUST MACHINES

Raymond M. Zimber, Bloomfield, N. J., assignor, by mesne assignments, to Radio Corporation of America, a corporation of Delaware Application November 19, 1929, Serial No. 408,193

31 Claims. (Cl. 176—2)

This invention relates to sealing apparatus, and with particularity to means for "sealing-off" lamps, vacuum tubes, audions, etc.

The object of the invention is to provide a novel form of torch for "sealing-off" the exhaust tubes of lamps, audions, or similar devices.

While the invention is capable of application to a wide variety of machines, it is particularly well suited to operate with an exhaust machine of the character described in application Serial No. 403,689 filed October 31, 1929. There is disclosed in said application a machine comprising a rotatable spider carrying a plurality of vacuum tubes such as lamps or audions to be exhausted. The spider is adapted to rotate in a step-by-step fashion to bring each tube in succession to a plurality of different positions where different operations are performed thereon. After the tube has been completely exhausted it is advanced to the "sealing-off" position wherein the so-called exhaust tube is separated from the lamp proper. Inasmuch as the mechanism for effecting this "seal-off" is stationary while the spider is movable it is necessary to maintain the "seal-off" torch out of the path of the traveling tubes. However, when a tube reaches the "sealing-off" position it is necessary to move the torch inwardly so that the sealing fires are brought into proper relation with the "exhaust-tube".

Accordingly one of the features of the present invention relates to a sealing torch which co-operates with a movable platform carrying a plurality of tubes to be exhausted together with means for moving the torch toward and away from the tubes at the proper times.

Another feature relates to a "sealing-off" torch which is adapted to be moved in one direction to bring the sealing fires into engagement with the portion of the lamp or audion to be sealed, and is adapted to be moved in another direction to separate the lamp or audion proper from the sealed-off exhaust-tube.

In the art of sealing-off glass tubular bodies it is well known that the tube must be given a gradual pull just at the moment that the glass walls begin to fuse and collapse. Automatic sealing machines in general are required to exhaust different kinds of tubes, and different batches of tubes may be made from glass having different physical characteristics, as regards fusing, temperatures, etc. It is highly important, therefore, to provide the machine with means whereby the fused portion may be subjected to just the right degree of tension and extent of pull in order to effect the correct kind of sealed-off "tip".

Accordingly it is another feature of the invention to provide a sealing-off torch for automatic exhaust machines wherein readily adjustable means are provided for accurately regulating the extent of pull to be exerted upon the fused portions of the usual exhaust-tube.

Another feature relates to a sealing-off device for automatic exhaust machines, together with novel means for applying a yielding tension on the exhaust-tube during the sealing-off operation.

A further feature relates to a sealing-off device for automatic exhaust machines having novel means for moving the sealing fires into and out of the path of the lamps or audions to be sealed.

A further feature relates to the manner of mounting a sealing torch for vertical and horizontal movement with respect to a lamp or bulb to be sealed.

A still further feature relates to the manner of dumping or ejecting the sealed lamp or bulb after the sealing operation is completed.

Other features and advantages not specifically enumerated will be apparent after a consideration of the following detail descriptions and the appended claims.

Referring to the drawings:

Figure 1 of the drawings shows a side view in elevation of the sealing mechanism according to the invention. This figure shows the sealing torch after it is moved horizontally into the path of the "exhaust-tube" to be sealed off.

Fig. 5A shows the relation between the sealing fires and the "exhaust-tube" during the sealing-off operation;

Fig. 6 is a sectional view taken along the line 6—6 of Fig. 2;

Fig. 7 is a sectional view taken along the line 7—7 of Fig. 2;

Fig. 8 is a detail study showing the manner in which the dump lever operates; and Fig. 9 is a sectional view taken along the line 9—9 of Fig. 1 to show the tension adjusting and limiting arrangement according to the invention.

Figure 1:
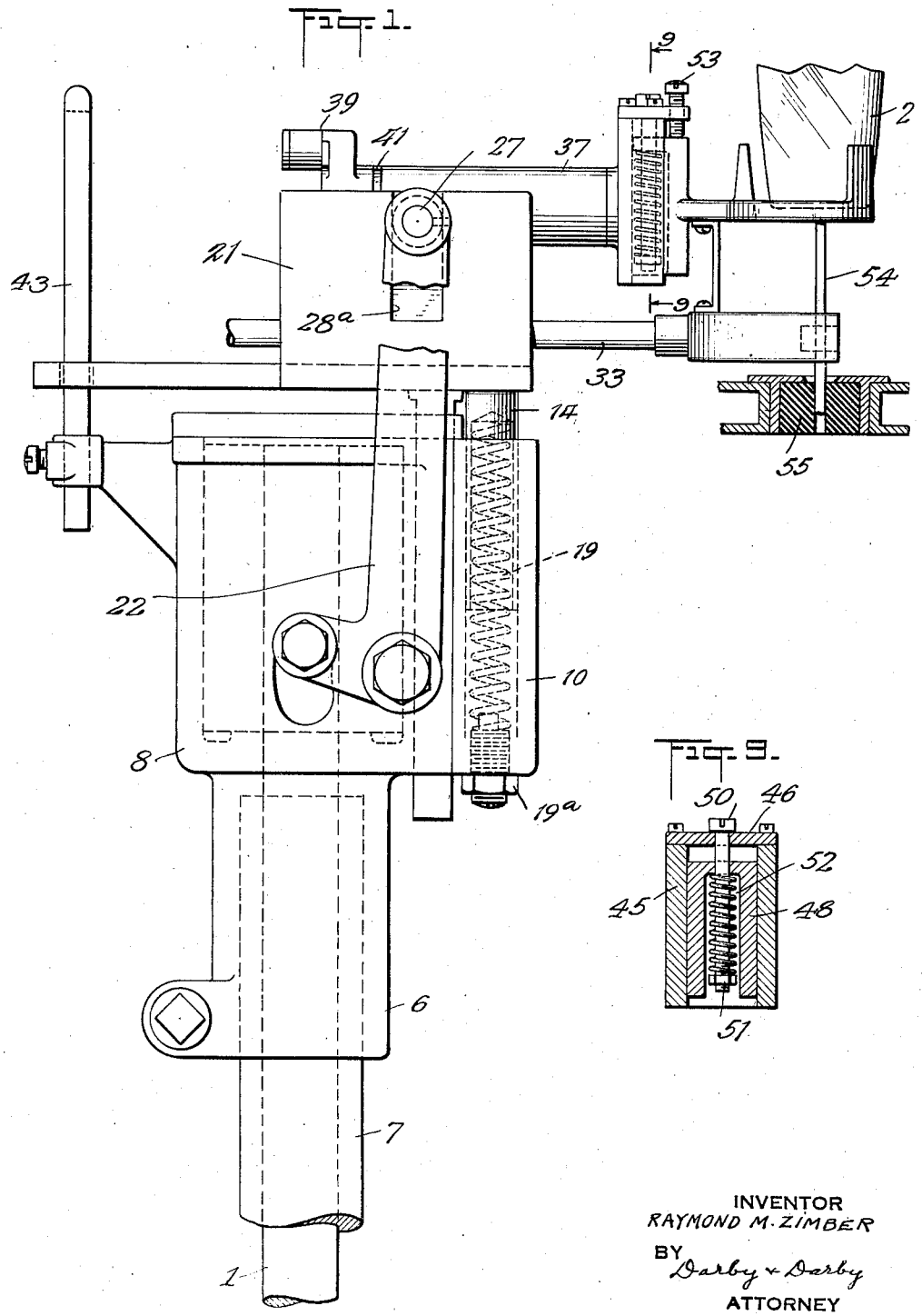
Figure 2:
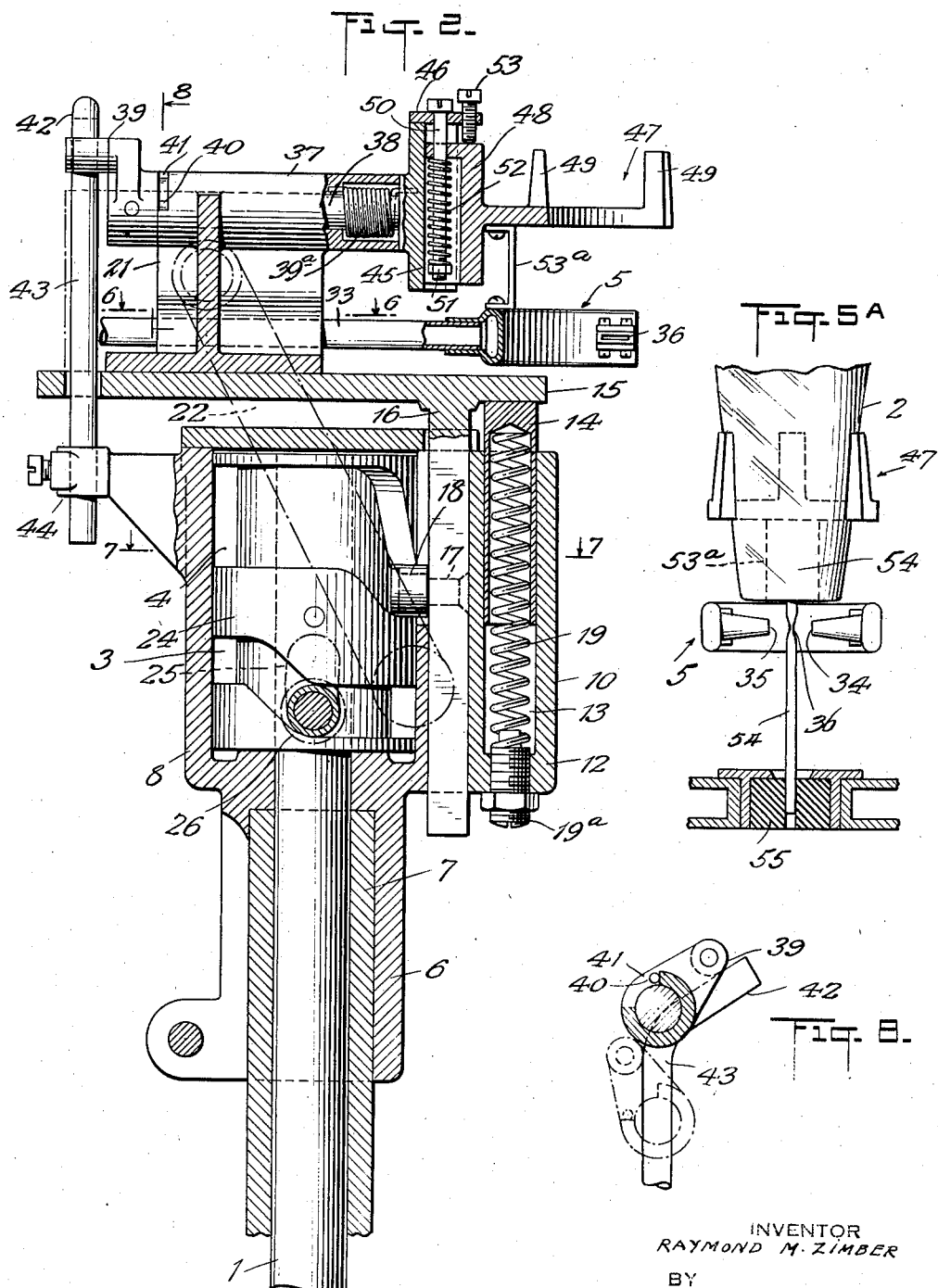
Fig. 2 is a partial sectional view of the mechanism shown in Figure 1 to show more clearly the internal construction thereof. This figure shows the sealing torch in its normally retracted position out of engagement with the "exhaust-tube".
Figure 3:
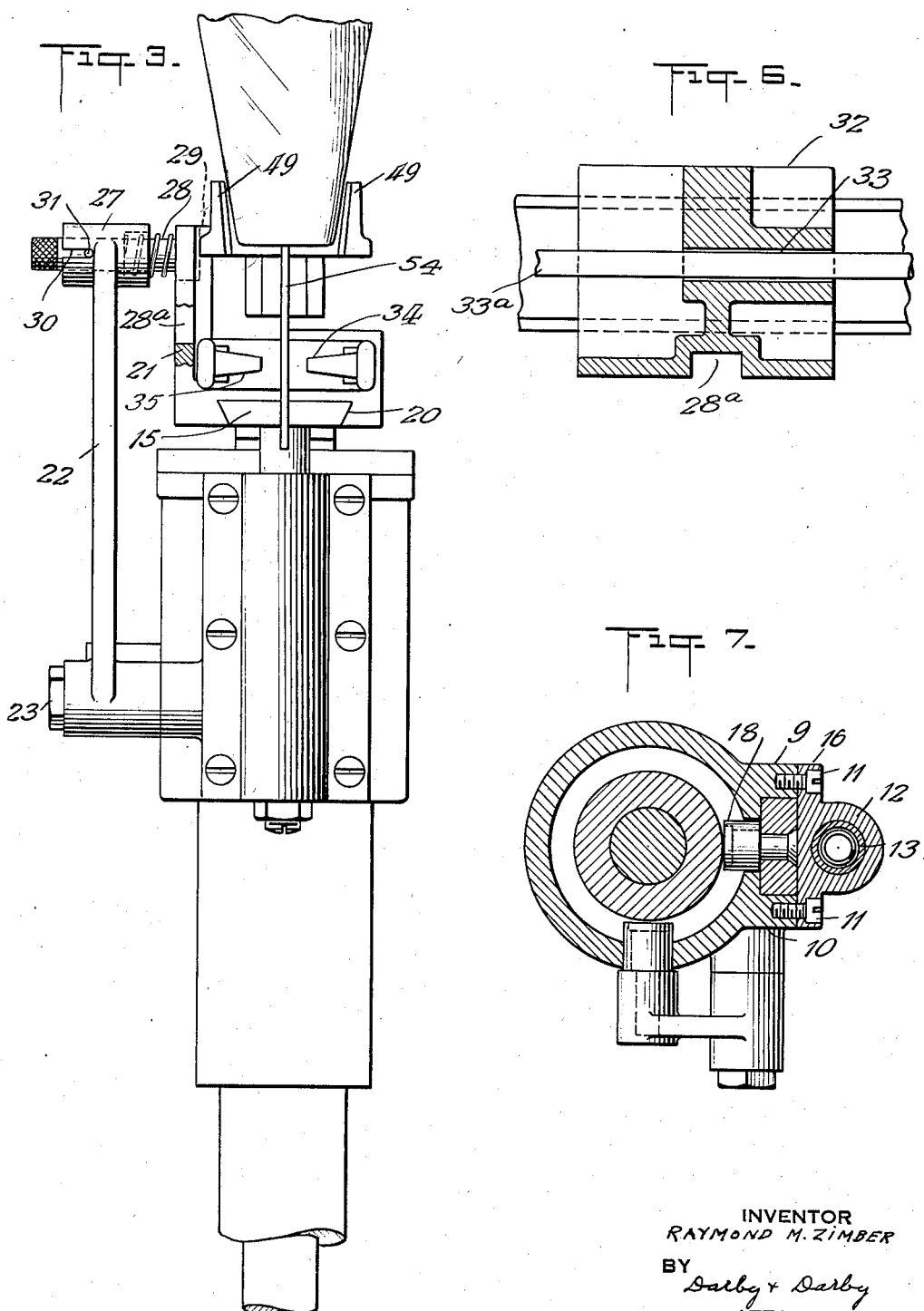
Fig. 3 is a right hand end view in elevation of the mechanism as shown in Fig. 2.

Referring more particularly to Figs. 1, 2 and 3, the numeral 1 represents a shaft which is adapted to be rotated when the bulb 2 reaches the sealing-off position of the machine as described in application Serial No. 403,689 referred to hereinabove. For this purpose the shaft 1 is mounted in suitable bearings (not shown). Affixed to shaft 1 is a double shrouded cam having two separate track portions 3 and 4. Cam 3 as described hereinafter, is for the purpose of controlling the horizontal movement of the sealing torch designated generally by the numeral 5, while cam 4 controls the vertical movement of the sealing torch and the associated mechanism. Rigidly supported on the frame work of the machine in any suitable manner is a housing 6, provided with a bearing lining 7 for the shaft 1, and an upper portion 8 wherein the cam is adapted to rotate. As shown more clearly in Fig. 7 the right hand upper end of housing 6 is provided with two ribs 9 and 10 to which is fastened, by suitable bolts 11, a member 12 having a bore 13 therein in which the hollow cylindrical slide 14 (Fig. 2) is adapted to move. Slide 14 is formed integrally with, or attached in any convenient manner, to the base 15 which carries the sealing torch 5 and associated mechanism. Likewise attached to the base 15 is a downwardly depending slide 16 rectangular in section, as shown more clearly in Fig. 7.

Slide 16 is adapted to move within the space defined by the ribs 9 and 10 and the flat wall of member 12 (Fig. 7). Slide 16 has attached thereto, by means of the sub-shaft 17, a roller 18 which is adapted to ride in the cam track 4. Thus as the shaft 1 and the cam affixed thereto rotate in the direction of the arrow (Fig. 2) the slide 16 and the base 15 are free to move upwardly under the force of a spring 19 which has one end seated against the bottom of the member 12, the other end pressing against the tension adjusting screw 19A. Thus spring 19 maintains the roller 18 in continuous contact with the upper wall of track 4.

As shown clearly in Fig. 3 the longitudinal edges of base 15 are inclined as represented by the numeral 20 and mounted for sliding movement on the member 15 is a casting 21 having a groove in the bottom thereof corresponding to the base 15 whereby the casting 21 is capable of sliding motion along base 15 and is capable of movement as a unit with the base in a vertical direction. For the purpose of reciprocating the casting 21 along the base 15 there is provided a bell crank lever 22 which is pivoted for rotation about a member 23 (Fig. 3) attached to the housing 8. The short arm of the bell crank lever extends through an arcuate opening 25 in the wall of housing 8 and carries a roller 26 which cooperates with cam track 3. The upper end 27 of the long arm 22 of the bell crank lever is provided with a spring pressed plunger 28 which registers with a slot 28a in the casting 21 to permit of vertical movement of the end 27 with respect to casting 21. The end 27 is provided with a slot 30 to receive a pin 31 on the end of plunger 28 by means of which the lever 22 may be disengaged from the casting 21. From the foregoing it will be seen that as the shaft 1 rotates, the casting 21 is subjected to a vertical movement under control of cam 4 and spring 19, as well as to a horizontal movement controlled by cam 3 and lever 22. Casting 21 as shown in Fig. 6 has a base portion 32 provided with a bore 33 through which extends the rubber tubing 33a.

Figure 4:
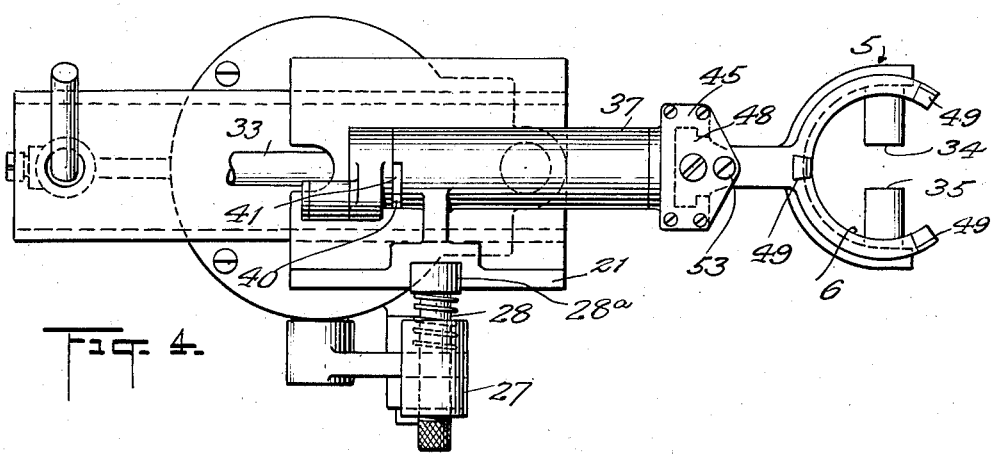
Fig. 4 is a top plan view of the mechanism of Fig. 1.

As shown more clearly in Fig. 4 torch 5 terminates in a hollow ring portion 6 having burner tips 34 and 35. These tips are preferably provided with wide narrow fire openings 36 (Fig. 2). The upper portion of casting 21 is in the form of a hollow cylindrical member 37 acting as a bearing and support for the circular rod 38 which passes therethrough. Rod 38 at its left hand end (Fig. 2) has affixed thereto an offset arm 39 by means of which the rod 38 may be rotated to effect the dumping or ejecting operation hereinafter described. Any suitable friction means may be provided between members 37 and 38 to prevent accidental jars from disturbing the position of member 47. For the purpose of limiting the rotational movement of the rod 38 within the member 37 the offset arm 39 carries a pin projection 40 which registers with an arcuate slot 41 in the end of member 37, as shown clearly in Figs. 2 and 4. Arm 39 and rod 38 are adapted to be maintained in the positions shown in Figs. 2 and 4 while the sealing operation is being performed under control of a suitable spring 39a. This position of the arm 39 is indicated by the full lines in Fig. 8. However, when the sealing operation is completed and the sealed tube or bulb is to be ejected the base 15, together with the arm 39 moves downwardly under control of cam 4 and the arm 39 engages the bent end 42 of a rod 43 rigidly attached to the housing 8 as indicated by numeral 44. Thus as the arm 39 continues to move downwardly it is rotated to the position represented by the dotted lines in Fig. 8 causing a corresponding rotation of rod 38. It will be understood that while the member 15 is moving upwardly from the position shown in Fig. 2 to its uppermost position, the casting 21 is moved toward the right under control of lever 22 so that arm 39 clears arm 42. Rod 38 terminates at its right hand end in a vertical channel member 45 which is bridged at the top by the member 46. Fitted within the member 45 for limited sliding movement therein is a bulb supporting bracket designated generally by the numeral 47. Member 47 terminates at its left hand end in a portion 48 adapted to fit within the groove or channel member 45 by which it is guided in its up and down movement, while at its right hand end member 47 is in the form of a partial ring having three upstanding arms 49 adapted to engage the envelope of the bulb or tube 2 that is being exhausted. Passing through the member 46 and likewise through the opening in the end of member 48 is a screw 50 which carries at its lower end a nut 51. Surrounding the screw 50 and adapted to press at one end against the nut 51 and at the other end against the member 48 is a spring 52. Thus in effect the bracket 47 is suspended by a yieldable link, comprising the spring 52, to the member 45. For the purpose of adjusting the normal relative position between the members 45 and 47 there is provided an adjusting screw 53 which is threaded into the members 46 and is adapted normally to bear against the upper face of the member 48. The function of the screw 53 will be more clearly apparent after the description of the method of operation to be given hereinbelow. In order that the sealing burners 36 may be maintained at the proper point with relation to the exhaust tube 54 at all times during the sealing operation, the bracket 47 is rigidly united to the torch frame 5 by a tie member 53a.

Figure 5:
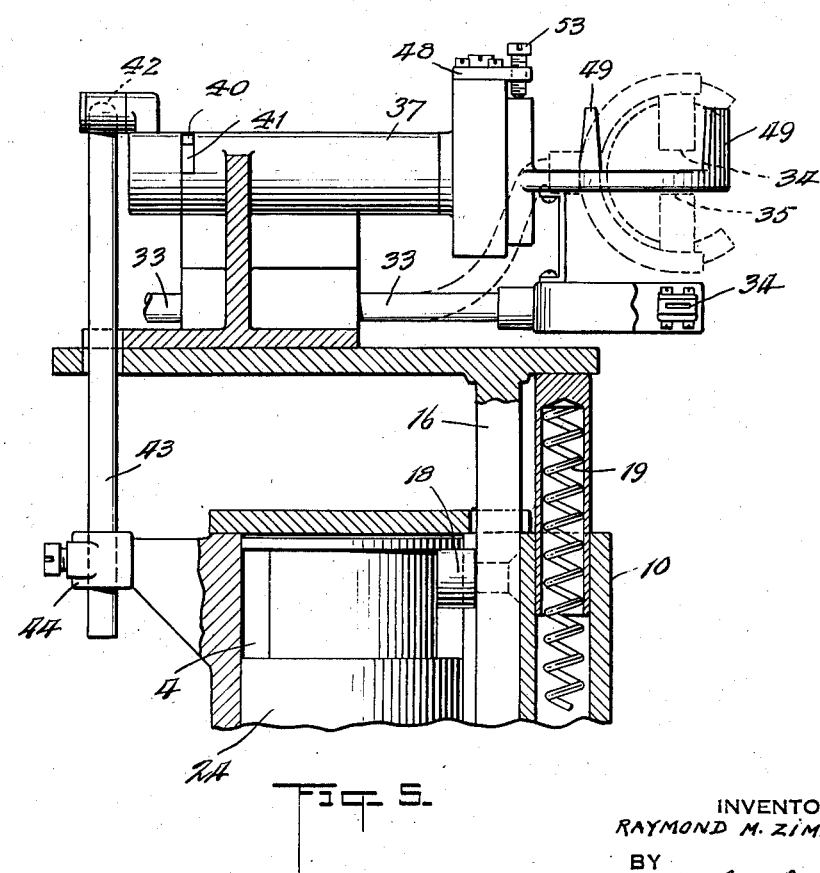
Fig. 5 is a view showing the bulb supporting mechanism in an upward position and with the bulb holder turned through an angle of 90° to eject the sealed bulb.

As described in detail in application Serial No. 403,689 referred to hereinabove the casting 21 carrying the bulb support bracket 47 and the sealing torch 5 is positioned adjacent the rotary head carrying the lamps or audions 2. In order that the rotary head may be indexed from position to position without interference, it is necessary that during such indexing movement the members 47 and 5 be withdrawn away from said rotary head. The relative position of the head with the tubes therein and the sealing fires, just before the latter are moved inwardly is shown in Fig. 2. As shown in Figs. 1 and 2 and as described in application Serial No. 403,689 referred to hereinabove, the bulb 2 is provided with a so-called "exhaust-tube" 54 which passes through and is gripped by a rubber coupling 55 carried in the rotary head of the machine. When a bulb has been completely exhausted and reaches the "sealing-off" position the shaft 1 is rotated in any suitable manner to cause frame 15 to move horizontally to bring the supporting bracket 47 and the sealing torch 5 from the position shown in Fig. 2 into the position shown in Fig. 1. After the members 5 and 47 are thus moving inwardly the lever 22 causes the said members to move vertically until the arms 49 embrace the bulb 2 as indicated in Fig. 5A. The frame 15 continues to move vertically until the roller 18 rides on the high part of cam 4. During this latter portion of the upward movement of member 47 the spring 52 is placed under compression since the upward movement of member 47 is limited by the latter engaging the envelope of bulb 2. Consequently there is a relative vertical displacement between members 45 and 48. When the limit of the upward movement of the frame 15 is reached, the sealing fires 36 are at the proper point for sealing the exhaust tube 54 which thereupon begins to melt and collapse as indicated in Fig. 5A. As the glass thus becomes molten the spring 52, which is continually exerting an upward pull on the envelope and on the exhaust tube, functions to separate the used portions. It is well known that in order to effect the proper type of seal-off that this so-called pull during the fusing operation must be accurately regulated and limited, and it is for this purpose that adjusting screw 53 is provided in the member 46. Thus as the exhaust tube 54 fuses, the bulb 2 is carried upwardly by arms 49 under control of spring 52, but the extent of this upward movement is positively limited by the engagement of member 48 with the screw 53. The spring 52 and the extent of the upward movement (determined by the adjustment of screw 53) may be so designed as to effect just the right type and length of seal-off in tube 54. When the seal-off has thus been completed the torch assembly is moved toward the left, under control of cam 3 to the position shown in Fig. 5. The assembly then moves downwardly under control of cam 4 and in doing so the arm 39 engages the end of rod 43 and causes the bracket 47 to be rotated to the dotted position (Fig. 5) whereby the sealed off bulb is dropped into a suitable conveyor or chute for the next operation. The assembly finally reaches the position indicated in Fig. 2 and is ready to seal-off the next bulb in the same manner. Since the sealing torch 5 is attached to the bracket 47 by member 53a during the limited upward movement of the bulb 2 due to the stretching of the exhaust tube, the sealing fires are playing upon substantially the same part of the exhaust tube and a "short-taper" seal-off is provided.

While specific apparatus is disclosed it will be understood that various changes may be made without departing from the spirit and scope of the invention. Thus instead of first moving the members 5 and 47 horizontally and then vertically in separate movements, the vertical and horizontal movements may be effected simultaneously. Furthermore while the device is particularly well suited to function with a rotary exhaust machine of the type disclosed in application Serial No. 403,689 wherein the shaft 1 is driven from the same source as drives the rotary head, it will be understood that shaft 1 may be rotated and the frame 21 may be reciprocated vertically and horizontally by any convenient means.

What is claimed is:

1. An attachment for automatic exhaust machines including a sealing torch, a frame in which said torch is mounted, and means comprising a plurality of cam surfaces for imparting to said frame separate non-arcuate vertical and horizontal motions.

2. A sealing torch for automatic exhaust machines comprising a burner, a frame in which said burner is mounted, means for imparting a horizontal sliding motion to said frame, and means for moving said frame vertically.

3. Means for sealing an evacuated container comprising a sealing torch, a frame in which said torch is mounted, means for imparting to said frame non-arcuate movement in one direction to bring the burner into proper relation to the portion of the container to be sealed, and means for moving the frame in a direction perpendicular to the direction of the first movement to separate parts of the sealed container.

4. The combination in an automatic exhaust machine of means for sealing-off an exhaust tube from the evacuated envelope portion of a lamp, audion or similar device, comprising a sealing torch normally out of engagement with the exhaust tube, means for automatically moving said torch in a non-arcuate path into and out of engagement with said exhaust tube, and means for moving said torch in another non-arcuate path to separate the envelope from the exhaust tube.

5. The combination according to claim 4 in which the sealing torch is provided with a pair of burners and a member adapted to embrace the envelope portion.

6. In a device of the character described the combination of a slidable frame, a member adapted to surround and apply a yielding tension on a lamp or audion envelope, said member being supported for horizontal sliding motion in said frame, and for a separate vertical motion as a unit with said frame.

7. A device according to claim 6 in which the said member is yieldably supported by said frame.

8. In a device of the character described the combination of a shaft, a burner frame controlled by said shaft, and means for rotating said shaft to move said frame in separate mutually perpendicular directions.

9. In a device of the character described the combination of a shaft, a frame adapted to move upwardly with relation to said shaft, and a sealing torch mounted for non-arcuate movement on said frame at right angles to said shaft.

10. In a device of the character described the combination of a shaft, a frame supported for longitudinal movement with respect to said shaft, and a sealing torch assembly mounted for non-arcuate sliding movement on said frame at right angles to said shaft.

11. A device according to claim 10 in which said frame is yieldably supported on said shaft.

12. In an automatic exhaust machine the combination of a sealing torch normally out of the path of a lamp or audion to be sealed, a rotatable shaft, and means for translating the rotary motion of said shaft into non-arcuate vertical and horizontal motions of said torch.

13. The combination according to claim 12 in which the means for translating the rotary motion comprises a slidable frame on which the torch is mounted, a pair of cams carried by said shaft, and a pair of cam followers carried by said frame.

14. In a device of the character described the combination of a rotatable shaft, a frame, a sealing torch mounted for non-arcuate sliding movement on said frame and yieldable means tending normally to raise said frame and a cam carried by said shaft for positively limiting the upward movement of said frame.

15. In a device of the character described a rotatable shaft, a main supporting frame adapted to move longitudinally with respect to said shaft, a second frame mounted for sliding movement on said first frame, said second frame carrying a sealing torch and a member adapted to engage the envelope portion of a lamp or audion, means responsive to the rotation of said shaft for moving said main frame, and means responsive to the rotation of said shaft for causing said second frame to slide on said main frame.

16. In a device of the character described a rotatable shaft and main supporting frame mounted for longitudinal movement with respect to said shaft, a second frame mounted for sliding movement on said frame, a first cam carried by said shaft for effecting vertical movement of said main frame, and a second cam carried by said shaft for effecting the sliding movement of said second frame.

17. In a device of the character described the combination of a frame, means for moving said frame in separate non-arcuate vertical and horizontal paths, a member adapted to engage the envelope portion of a lamp or audion to support the lamp during a sealing-off operation, said member being capable of limited vertical movement, and means for rotating said member to eject a lamp or audion after sealing.

18. In a device of the character described a vertically movable frame comprising two portions capable of relative longitudinal sliding movement, means for moving both said portions as a unit, means including the envelope of a lamp or audion for arresting the movement of one portion of the frame without arresting the movement of the other portion.

19. A device according to claim 18 in which the said two portions are coupled together by a yieldable link whereby a yielding force is applied to the envelope of the lamp or audion while the said two portions are undergoing relative displacements.

20. In a device of the character described the combination of a frame adapted to move separately in non-arcuate vertical and horizontal directions, a sealing torch mounted on said frame, and means for applying a yielding force on the exhaust tube of a lamp or audion being sealed.

21. A device according to claim 20 in which the means for applying the yielding force comprises a member adapted to be moved as a unit with said frame until it engages the envelope of the lamp or audion, and means whereby further movement of said frame applies a gradual force on the fused walls of the exhaust tube.

22. In a device of the character described a frame, means for fusing the walls of the exhaust tube portion of a lamp or audion, a member yieldably supported on said frame and capable of limited vertical motion, means for moving said frame together with said member until the movement of said member is arrested by engagement with the envelope of the lamp or audion, and means responsive to such arresting for storing a tensile force, said force being released as the exhaust tube becomes fused, whereby the envelope portion is separated and sealed from the exhaust tube and means for moving said frame in separate non-arcuate horizontal and vertical paths.

23. In a device of the character described the combination of a movable frame, a member carried by said frame for non-arcuate vertical sliding movement therein, means for moving said member in a non-arcuate horizontal movement said member adapted to apply a tensile force on the exhaust tube of a lamp or audion being sealed, means for adjusting the strength of said tensile force and the distance through which said member moves when said tensile force is released.

24. In a device of the character described, a sealing-off torch and means comprising a plurality of cam surfaces for moving said torch in non-arcuate separate rectilinear paths.

25. In a device of the character described, a sealing-off torch and means comprising a plurality of cam surfaces for moving said torch in separate non-arcuate horizontal and vertical motions in the same plane.

26. In a device of the character described, a sealing-off torch and means comprising a plurality of cam surfaces for translating said torch in mutually non-arcuate perpendicular directions.

27. An exhaust machine for electric bulbs including a plurality of exhaust heads, means for moving said exhaust heads past the sealing off station in succession and a sealing off mechanism comprising a reciprocable member, a torch frame carried by said reciprocable member and relatively reciprocable thereon, yielding means disposed between the reciprocable member and the torch frame and means for moving the reciprocable member to cause the torch frame to dip under an advancing bulb and to move the same into yielding engagement with the bulb whereby upon softening of the exhaust tube the bulb is separated from the exhaust head by a straight rectilinear movement in line with the exhaust tube.

28. In an exhaust machine a frame support, a turntable, means for intermittently moving the turntable, a plurality of exhaust heads carried by the table, a reciprocating member carried by said frame adjacent the table, a bracket mounted on said reciprocable member for actuation thereby but having limited rectilinear reciprocating movements relative thereto, a spring interposed between the bracket and the reciprocable member, a bulb holder rigidly carried by said bracket, means for heating the exhaust tube, and means for moving said reciprocable head and bracket sufficiently to cause the bulb holder to dip under an advancing bulb and then actuating said reciprocating member and bracket to a position causing the bulb holder to yieldingly engage the bulb.

29. In an exhaust machine a frame support, a turntable, means for intermittently moving the turntable, a plurality of exhaust heads carried by the table, a reciprocating member carried by said frame adjacent the table, a bracket mounted on said reciprocable member for actuation thereby but having limited reciprocating movements relative thereto, a spring interposed between the bracket and the reciprocable member, a bulb holder rigidly carried by said bracket, means for heating the exhaust tube, and means for moving said reciprocable head and bracket sufficiently to cause the bulb holder to dip under an advancing bulb and then actuating said reciprocating member and bracket to a position causing the bulb holder to yieldingly engage the bulb, wherein the reciprocable member has one end disposed adjacent an opening of the bracket with the spring interposed between the bracket and said reciprocable member.

30. In an exhaust machine a frame support, a turntable, means for intermittently moving the turntable, a plurality of exhaust heads carried by the table, a reciprocating member carried by said frame adjacent the table, a bracket mounted on said reciprocable member for actuation thereby but having limited reciprocating movements relative thereto, a spring interposed between the bracket and the reciprocable member, a bulb holder rigidly carried by said bracket, means for heating the exhaust tube, and means for moving said reciprocable head and bracket sufficiently to cause the bulb holder to dip under an advancing bulb and then actuating said reciprocating member and bracket to a position causing the bulb holder to yieldingly engage the bulb wherein the reciprocable member has an end disposed adjacent an opening of the bracket with the spring interposed between the bracket and said reciprocable member, said bracket being guided by a stationary guide secured to the reciprocable member.

31. In an exhaust machine an intermittently rotatable turntable, a plurality of exhaust heads carried by said table, a reciprocable member disposed at the sealing off station, a bulb support supported by said reciprocable member for engagement with the advancing bulbs, an intermediate support for the bulb support yieldingly mounted on the reciprocable member for rectilinear and reciprocating movements thereon, a rotating cam normally permitting said reciprocating member to be in its elevated position against the tension of a spring but having a dip in its surface to cause the depressing of the reciprocating member when a bulb is advancing to the sealing off station to cause the bulb holder to dip under the bulb.

RAYMOND M. ZIMBER.